US007388764B2

(12) United States Patent
Huynh et al.

(10) Patent No.: US 7,388,764 B2
(45) Date of Patent: Jun. 17, 2008

(54) PRIMARY SIDE CONSTANT OUTPUT CURRENT CONTROLLER

(75) Inventors: Steven Huynh, Santa Clara, CA (US);
Mingliang Chen, Seterrett, AL (US);
Chuan Xiao, ShangHai (CN); Mingfan Yu, Shanghai (CN)

(73) Assignee: Active-Semi International, Inc. (KY)

( * ) Notice: Subject to any disclaimer, the term of this patent is extended or adjusted under 35 U.S.C. 154(b) by 65 days.

(21) Appl. No.: 11/311,656

(22) Filed: Dec. 17, 2005

(65) Prior Publication Data
US 2006/0285365 A1 Dec. 21, 2006

Related U.S. Application Data

(60) Provisional application No. 60/691,980, filed on Jun. 16, 2005.

(51) Int. Cl.
*H02M 3/335* (2006.01)
(52) U.S. Cl. ................... 363/21.16; 363/21.12
(58) Field of Classification Search ........... 323/222, 323/232, 265, 290, 282, 284, 285, 266, 299, 323/303; 363/21.01, 21.12, 21.16, 16, 97
See application file for complete search history.

(56) References Cited

U.S. PATENT DOCUMENTS

| | | | | | |
|---|---|---|---|---|---|
| 4,301,497 | A | * | 11/1981 | Johari | 363/21.12 |
| 4,849,869 | A | * | 7/1989 | Tanuma et al. | 363/21.13 |
| 4,894,662 | A | * | 1/1990 | Counselman | 342/357.12 |
| 5,363,288 | A | * | 11/1994 | Castell et al. | 363/21.12 |
| 5,436,550 | A | * | 7/1995 | Arakawa | 323/222 |
| 5,754,414 | A | * | 5/1998 | Hanington | 363/21.12 |
| 5,841,643 | A | * | 11/1998 | Schenkel | 363/21.13 |
| 6,229,366 | B1 | | 5/2001 | Balakirshnan | |
| 6,239,558 | B1 | | 5/2001 | Fujimura et al. | 315/307 |
| 6,696,882 | B1 | * | 2/2004 | Markowski et al. | 327/531 |
| 6,704,380 | B1 | * | 3/2004 | Kaewell | 375/367 |
| 6,721,192 | B1 | | 4/2004 | Yang | |
| 6,864,644 | B2 | | 3/2005 | Kernahan | 315/307 |
| 6,944,034 | B1 | * | 9/2005 | Shteynberg et al. | 363/21.13 |
| 6,958,920 | B2 | * | 10/2005 | Mednik et al. | 363/19 |
| 6,967,472 | B2 | | 11/2005 | Balakrishnan | |
| 7,019,506 | B2 | | 3/2006 | Kernahan | 323/284 |
| 7,061,780 | B2 | | 6/2006 | Yang et al. | 363/21.16 |
| 7,088,598 | B2 | | 8/2006 | Yang et al. | 363/21.01 |
| 2001/0032685 | A1 | * | 10/2001 | Nakajima et al. | 148/306 |
| 2002/0039298 | A1 | | 4/2002 | Riggio et al. | 363/22 |
| 2004/0046543 | A1 | * | 3/2004 | Choi | 324/142 |
| 2004/0075600 | A1 | | 4/2004 | Vera et al. | 341/166 |
| 2005/0197791 | A1 | * | 9/2005 | Matsumoto | 702/60 |
| 2005/0202570 | A1 | * | 9/2005 | Pusiol | 436/173 |
| 2005/0275386 | A1 | * | 12/2005 | Jepsen et al. | 322/9 |
| 2006/0002155 | A1 | * | 1/2006 | Shteynberg et al. | 363/21.12 |

(Continued)

*Primary Examiner*—Adolf Berhane
*Assistant Examiner*—M'Baye Diao
(74) *Attorney, Agent, or Firm*—Imperium Patent Works

(57) ABSTRACT

A lower-cost and more precise control methodology of regulating the output current of a Flyback converter from the primary side is provided. The methodology regulates the output current accurately in both continuous current mode (CCM) and discontinuous mode (DCM) and can be applied to most small, medium, and high power applications such as cell phone chargers, power management in desktop computers and networking equipment, and, generally, to a wide spectrum of power management applications. Two highly integrated semiconductor chips based on this control methodology are also described that require very few components to build a constant current Flyback converter.

26 Claims, 10 Drawing Sheets

U.S. PATENT DOCUMENTS

| | | | |
|---|---|---|---|
| 2006/0077697 A1 | 4/2006 | Yang | 363/21.13 |
| 2006/0113973 A1* | 6/2006 | Fukumoto et al. | 323/282 |
| 2006/0133117 A1 | 6/2006 | Berghegger | 363/19 |
| 2008/0007982 A1* | 1/2008 | Piper et al. | 363/97 |

* cited by examiner

PRIMARY SIDE CONSTANT OUTPUT CURRENT CONTROLLER

CROSS-REFERENCE TO RELATED APPLICATIONS

The present utility patent application claims priority benefit of the U.S. provisional application for patent having Ser. No. 60/691,980, filed on Jun. 16, 2005, under 35 U.S.C. 119(e). The contents of this related provisional application are incorporated herein by reference.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to the field of power conversion. More particularly, the invention relates to switching mode power supplies with regulated output current.

BACKGROUND OF THE INVENTION

With the aggressive growth of battery powered portable electronics, e.g., cell phones, the demand for lower cost, lighter weight and better efficiency battery chargers is very high. Historically, linear power supplies have been employed. However, despite being low in cost, they cannot generally outperform switching mode power supplies, which have lower weight and much higher efficiency. For many applications, the Flyback converter is often chosen from among different switching mode topologies to meet this demand due to its simplicity and good efficiency.

Over the years, various integrated circuit (IC) chips have been developed and used to build constant current Flyback power supplies. For example, FIG. 1 is an illustration of a prior art secondary side controlled constant output current Flyback converter. Such a converter comprises a transformer 201 (which has three windings), a secondary side resistor 301 (which represents the copper loss of transformer 201), a primary switch 105, a current sense resistor 106, a secondary rectifier 302, an output capacitor 303, an optical coupler 202, a second current sense resistor 305, a bias resistor 304, a current limit transistor 306, and a conventional Pulse Width Modulation (PWM) control IC 104. Resistor 101 and capacitor 102 provide the initial start-up energy for IC 104. A general characterization of basic concepts of operation will be described next. Once the Flyback converter is stable, IC 104 is powered by the auxiliary winding (with Na number of turns) of transformer 201 via rectifier 103. The output current is controlled by resistor 305 and transistor 306. Transistor 306 regulates the voltage across resistor 305 to a preset voltage VBE (e.g., 0.65V). The output current, therefore, is equal to VBE divided by the resistance of resistor 305. This circuit, however, is generally undesirable at least both because VBE and the output current vary with temperature and the voltage VBE causes significant power loss.

Some known approaches for primary feedback control of constant output current switching regulators teach the use of a reflected auxiliary winding voltage or current to control the primary inductor peak current. One known deficiency of such known methods is that the output current constant control is applicable only in discontinuous conduction mode (DCM) operation, thereby limiting the power capability of the power converter. For operation in continuous conduction mode (CCM), current industry solutions almost entirely rely exclusively on the use of an optocoupler as shown in FIG. 1. Typically, they will use the auxiliary current/voltage (e.g., via diode and RC filters) to control the peak primary current. When auxiliary current (i.e., the control current) decreases, the primary current is reduced. Some known techniques use auxiliary voltage to control primary current by essentially scaling the peak current (IPEAK) as proportional to a square root of the output voltage; i.e., SQRT(VOUT).

In view of the foregoing, what is needed is a relatively low-cost and effective control methodology of regulating the primary side output current of a Flyback converter. It would be desirable if at least some of the foregoing limitations of the prior art are overcome for operation in both continuous current mode (CCM) and discontinuous mode (DCM), preferably with a minimal number of IC chips (e.g., two IC chips). It is further desirable that the need for a secondary circuit and optical coupler are eliminated, and that the output current of a Flyback converter be largely insensitive to temperature variations.

BRIEF DESCRIPTION OF THE DRAWINGS

The present invention is illustrated by way of example, and not by way of limitation, in the figures of the accompanying drawings and in which like reference numerals refer to similar elements and in which.

SUMMARY OF THE INVENTION

Figure 1:
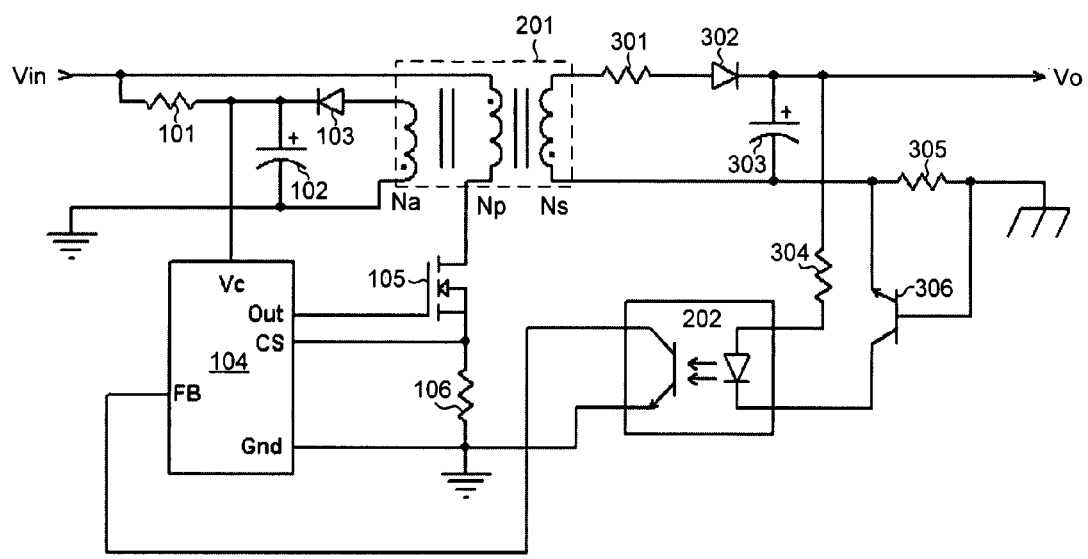
FIG. 1 is an illustration of a prior art secondary side controlled constant output current Flyback converter.

To achieve the foregoing and other objects and in accordance with the purpose of the invention, a variety of techniques to regulate the output current of a switching regulator are described.

Some embodiments of the present invention provide a primary side, constant output current PWM controller system and/or IC for a switching regulator with a transformer having at least a primary, a secondary, and an auxiliary winding, where the system or regulator includes: a reference signal for setting the output current level of the switching regulator; a transformer reset time detector that has a feedback input for the auxiliary winding of the transformer used in a switching regulator and computes a transformer reset time signal based on the auxiliary winding feedback input; a multiplier, which outputs a calculation (e.g., multiplication) on signals that is derived from a feedback signal corresponding to the output current of the switching regulator and the transformer reset time signal, the output of the multiplier being operable as a calculated output current; an error amplifier, which outputs a signal based on the difference between the reference signal and the calculated output current; a comparator that is configured to compare one or more ramp signals such as, without limitation, the output of the calculator unit, the error amplifier output and/or the output current feedback signal; a PWM controller module that outputs a PWM switching regulator control signal based on an oscillator output and the comparator output; and a gate drive module that receives the PWM control signal and generates a corresponding gate drive signal operable for properly turning on and off a switched power output device of the switching regulator.

A multiplicity of other embodiments may further provide variations of the prior embodiments in which the reference signal is a programmable current mirror circuit operable to output a programmed current; and/or in which the switched power output device is a power MOSFET that is configured as the main power switch of the switching regulator; and/or embodiments further include a current sensing circuit for generating the output current feedback signal where the current sensing circuit optionally comprises a MOSFET connected in parallel with the switched power output device; and/or in which the comparator is a peak current mode PWM comparator with a slope-compensation input.

Another embodiment of the present invention provides means for achieving the functions described in the foregoing system embodiments.

In yet other embodiments of the present invention, a constant output current PWM controller printed circuit board (PCB) module is described that includes a PCB and an embodiment of the foregoing integrated circuit device joined onto the PCB, where the PCB can be optionally populated with the necessary electronic components such that, in functional combination with the integrated circuit (IC) device, the PCB module is operable to perform as a constant current switching regulator.

A method, according to another embodiment of the present invention, is provided for regulating the output current of a Flyback converter from the primary side, and such method includes steps for: computing a calculated output current based on the average current of a primary power switch and a transformer reset time, regulating the output current of the Flyback converter to a desired value, and reducing the temperature sensitivity of the output current.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognized a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

The present invention will now be described in detail with reference to embodiments thereof as illustrated in the accompanying drawings.

Figure 2:
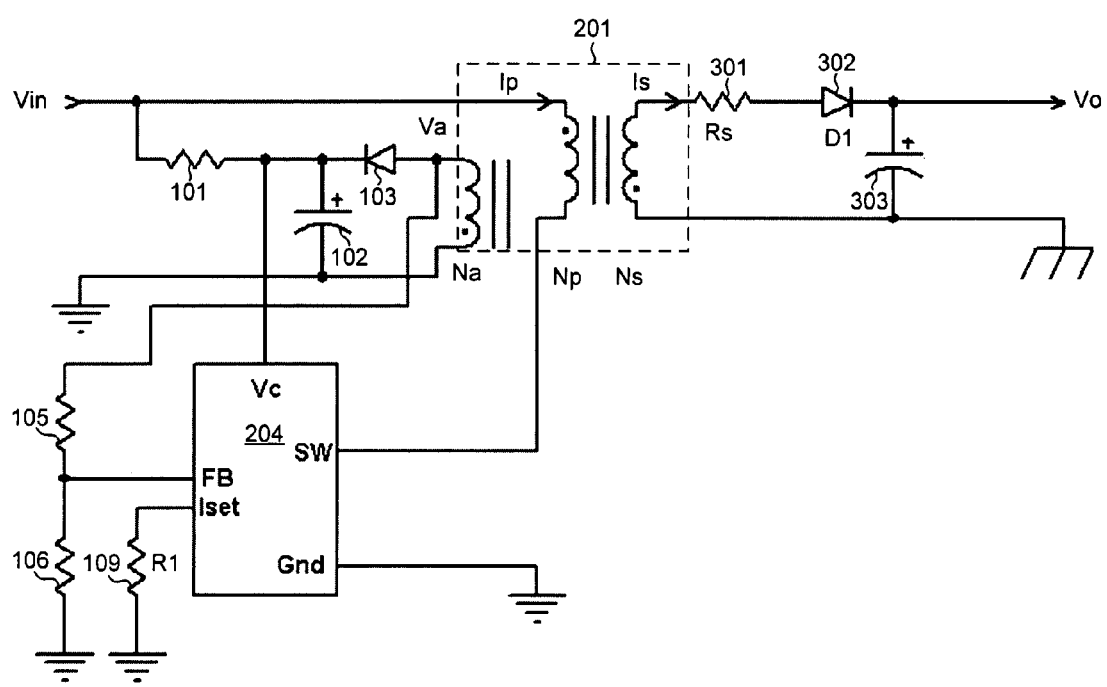
FIG. 2 is an example of a primary side controlled constant output current Flyback converter according to a first embodiment of the present invention.

FIG. 2 illustrates an exemplary circuit implementing a PWM controller IC chip 204, in accordance with a first embodiment of the present invention. The circuit shown is a primary side controlled constant output current Flyback converter. The converter shown comprises a transformer 201 (which has three separate coil windings: primary with $N_p$ turns, secondary with $N_s$ turns, and auxiliary with $N_a$ turns), a secondary side resistor 301 (which represents the copper loss of transformer 201), a secondary rectifier 302, an output capacitor 303, and a peak current mode PWM control IC 204. Resistor 101 and capacitor 102 provide the initial start-up energy for IC 204. Once the Flyback converter is stable, IC 204 is powered by the auxiliary winding of transformer 201 via rectifier 103. Resistor 109 programs the output current. Resistor dividers 105 and 106 then provide an input signal for computing the transformer reset time ($T_r$) via the $T_r$ Detection circuit inside IC 204.

Figure 3:
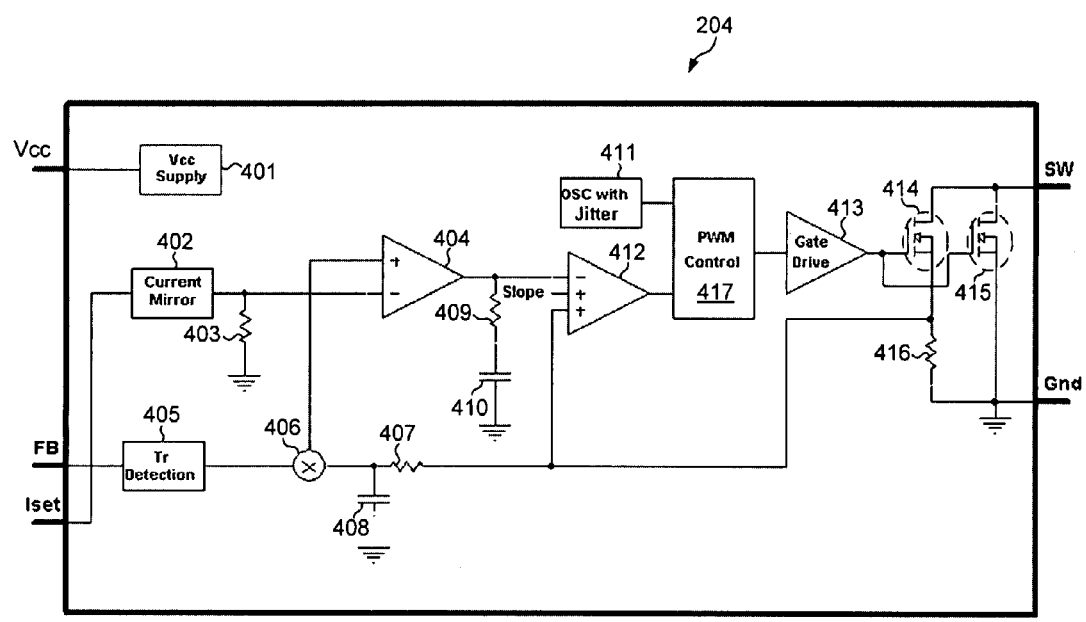
FIG. 3 illustrates an exemplary block diagram of IC chip shown in FIG. 2 in accordance with an embodiment of the present invention.

FIG. 3 illustrates an exemplary block diagram of IC chip 204 shown in FIG. 2 in accordance with an embodiment of the present invention. As illustrated, $V_{CC}$ supply 401 provides an internal power supply and reference voltage. Current mirror 402 duplicates current $I_{set}$ to resistor 403. $T_r$ Detection 405 computes $T_r$ based on the $V_a$ voltage waveform coming from FB input pin. Those skilled in the art, in light of the teachings of the present invention, will readily recognize that the feedback for the FB input pin may come from any other suitable source beyond the auxiliary winding of the transformer such as, by way of example, and not limitation, from the primary winding. In alternate embodiments of the present invention (not shown), the transformer does not have any auxiliary windings, and only has a primary and a secondary winding. Those skilled in the art, will recognize a multiplicity of alternate and suitable transformer types and interface circuit configurations to be operable with connection to the FB input pin.

In the embodiment shown, calculation unit 406 performs multiplication between $I_{P\_AVG}$ and $T_r$, however, in other embodiments of the present invention, depending on the needs of the particular application, any suitable math function may be implemented instead of multiplication, as will be readily determined by those skilled in the art, in light of the present teachings.

Error amplifier 404 then compares the calculated output current with a programmed value across resistor 403. Resistor 407 and capacitor 408 are coupled to form an averaging circuit for the primary current. Resistor 409 and capacitor 410 form a compensation network for amplifier 404. Comparator 412 serves as a peak current mode PWM comparator with an optional slope compensation input. In other embodiments of the present invention (not shown), the comparator may be configured by those skilled in the art to compare any suitable ramp signals depending upon the needs of the particular application. System oscillator 411 provides an optional frequency jittering function that widens the frequency spectrum and achieves a lower conducting EMI emission. An example of a preferred frequency jittering circuit is described in connection with FIG. 9.

Alternate embodiments of the present invention may not include the frequency jittering function in system oscillator 411 and/or slope compensation. In many applications, slope compensation and the system oscillator jitter function can improve converter operation in certain input/output operating conditions; however, these functions are completely optional, whereby alternate embodiments of the present invention may not include either one or both.

PWM control unit 417 then generates the correct PWM waveform by utilizing a cycle-by-cycle current limiting function. MOSFET 413 is a relatively high speed MOSFET gate driver. Power internal MOSFET 415 serves as the main switch, while a small die size allocated internal MOSFET 414 and resistor 416 form a current sense circuit. As will be readily apparent to the system designer, some applications may not require resistor 416 to generate the current sensing voltage feedback or it may be located in other circuit configurations, or embedded into other system components. As will be readily recognized by those skilled in the art, depending upon the needs of the particular application and current technology, the power MOSFET may be formed in any suitable manner. By way of example, and not limitation, the power MOSFET may be comprised of a multiplicity of smaller MOSFET device to form a single power MOSFET. In contrast with conventional approaches that only work in DCM, the present embodiment implements a method for using "sampled Auxiliary Flyback Voltage" to control the primary current. Sampling the Auxiliary Flyback Voltage at a known time point provides a more accurate representation of the actual output voltage in most applications. The present embodiment is largely independent of auxiliary voltage and/or current by, for example, basing output current control only on primary current sensing and the ratio of T_R/T_ON, which works in both DCM and CCM. Hence, embodiments of the present invention preferably do not use auxiliary voltage to control primary current by essentially scaling the peak current (IPEAK) as proportional to a square root of the output voltage, as is done in conventional approaches.

Figure 4:
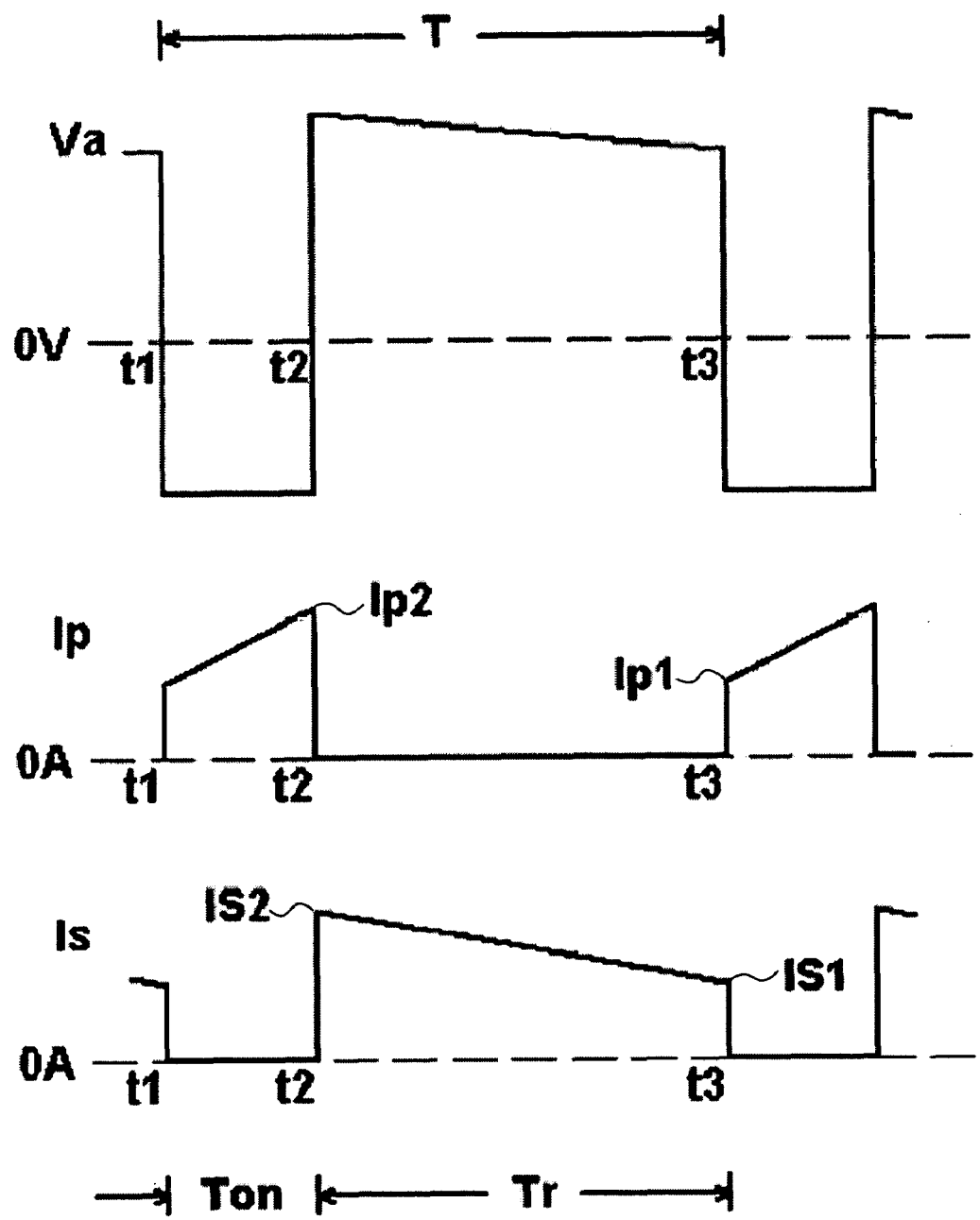
FIG. 4 illustrates exemplary ideal waveforms of the auxiliary winding voltage, primary switch current, and secondary rectifier current operating in continuous current mode (CCM) according to an embodiment of the present invention.

FIG. 4 illustrates exemplary ideal waveforms of the auxiliary winding voltage, primary switch current, and secondary rectifier current operating in continuous current mode (CCM) according to an embodiment of the present invention. Main switch 415 turns on at $t_1$, turns off at $t_2$ and turns on again at $t_3$. The switching period is T, the turn-on time is $T_{on}$ and the turn-off time is $T_r$. Using known theory, the output current $I_{out}$ can be expressed as:

$$I_{out} = (\tfrac{1}{2}) \cdot (I_{S1} + I_{S2}) \cdot (T_r/T). \tag{1}$$

Because $$I_{S1} = (N_P/N_S) \cdot I_{P1} \tag{2}$$

and $$I_{S2} = (N_P/N_S) \cdot I_{P2}, \tag{3}$$

$I_{out}$ may be expressed by combining (1), (2) and (3) as shown in (4) below.

$$I_{out} = (\tfrac{1}{2}) \cdot (N_P/N_S) \cdot (I_{P1} + I_{P2}) \cdot (T_r/T). \tag{4}$$

Furthermore, because $$I_{P\_AVG} = (\tfrac{1}{2}) \cdot (I_{P1} + I_{P2}) \cdot (T_{ON}/T) \tag{5}$$

equations (4) and (5) may be combined to express $I_{out}$ as shown in (6) below $$I_{out} = (N_P/N_S) \cdot (T_r/T_{ON}) \cdot I_{P\_AVG} \tag{6}$$

Figure 5:
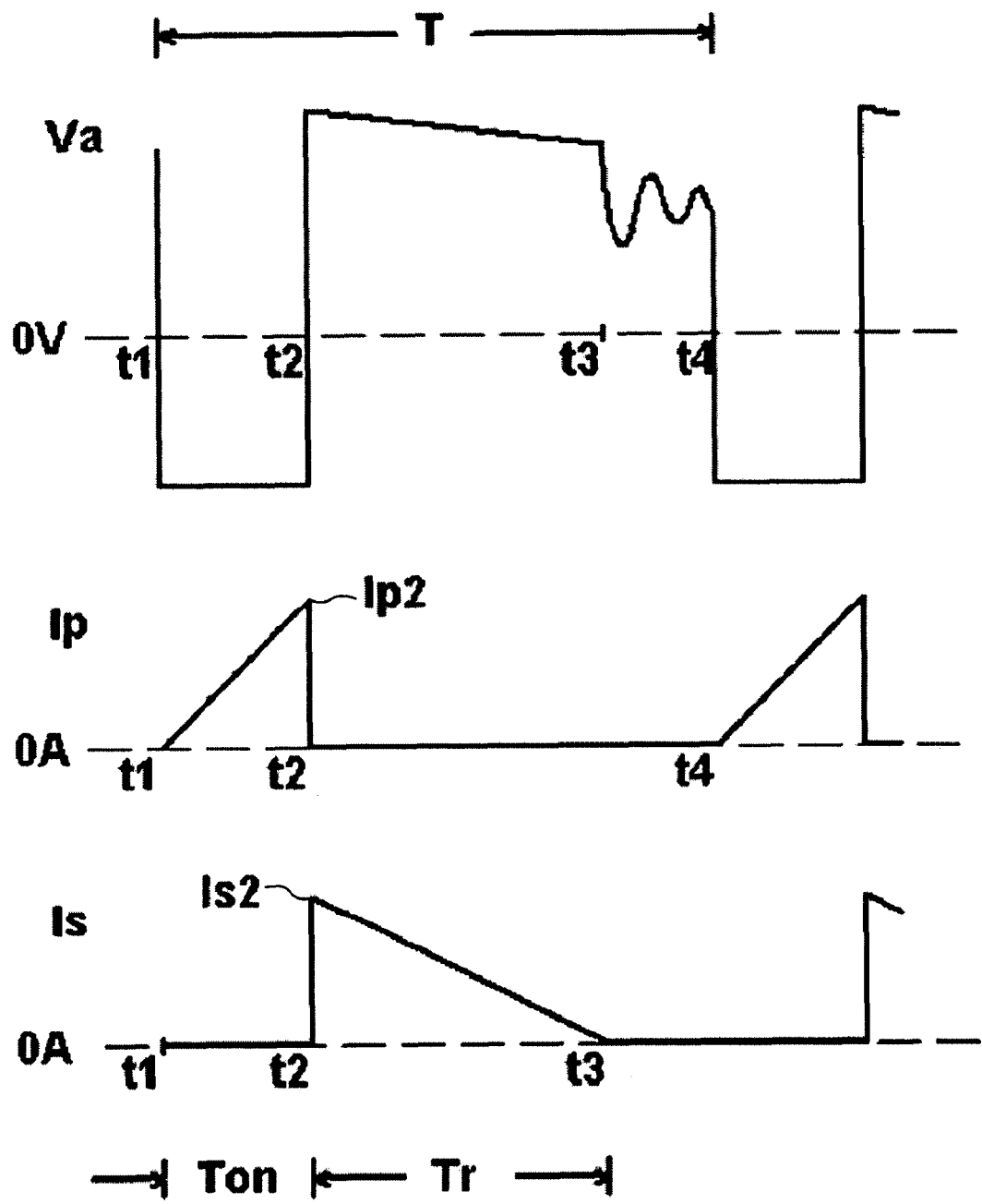
FIG. 5 illustrates exemplary ideal waveforms of the auxiliary winding voltage, primary switch current and secondary rectifier current operating in discontinuous current mode (DCM) according to an embodiment of the present invention.

FIG. 5 illustrates ideal waveforms of the auxiliary winding voltage, primary switch current, and secondary rectifier current operating in discontinuous current mode (DCM) according to an embodiment of the present invention. Main switch 415 turns on at $t_1$, turns off at $t_2$, and turns on again at $t_4$. The switching period is T, the turn-on time is $T_{on}$ and the turn-off time is equal to $(t_4-t_2)$. As shown in FIG. 5, the current at the secondary winding of transformer 201 discharges to zero at $t_3$. Because Tr is equal to $(t_3-t_2)$, the output current can be expressed as:

$$I_{out} = (\tfrac{1}{2}) \cdot I_{S2} \cdot (T_r/T). \tag{7}$$

Because $I_{S2} = (N_P/N_S) \cdot I_{P2}$, (8)

$I_{out}$ may be expressed by combining (7) and (8) as shown in (9) below:

$$I_{out} = (\tfrac{1}{2}) \cdot (N_P/N_S) \cdot I_{P2} \cdot (T_r/T). \tag{9}$$

Furthermore, because $$I_{P\_AVG} = (\tfrac{1}{2}) \cdot I_{P2} \cdot (T_{ON}/T), \tag{10}$$

$I_{out}$ may be expressed by combining (9) and (10) as shown in (11) below $$I_{out} = (N_P/N_S) \cdot (T_r/T_{ON}) \cdot I_{P\_AVG} \tag{11}$$

The output power of the converter generally depends only on the stored energy of the inductor in DCM operating mode, in accordance with the following formula (12), which neglects efficiency losses:

$$Vo*Io = (\tfrac{1}{2})*Lp*Ip^2*F. \tag{12}$$

In the CCM operating mode, at the output of the converter output, the voltage is dropping from $V_{norm}$ to zero. To keep Io constant, F is preferably reduced proportionally to Vo while maintaining a fixed Ip.

Figure 6:
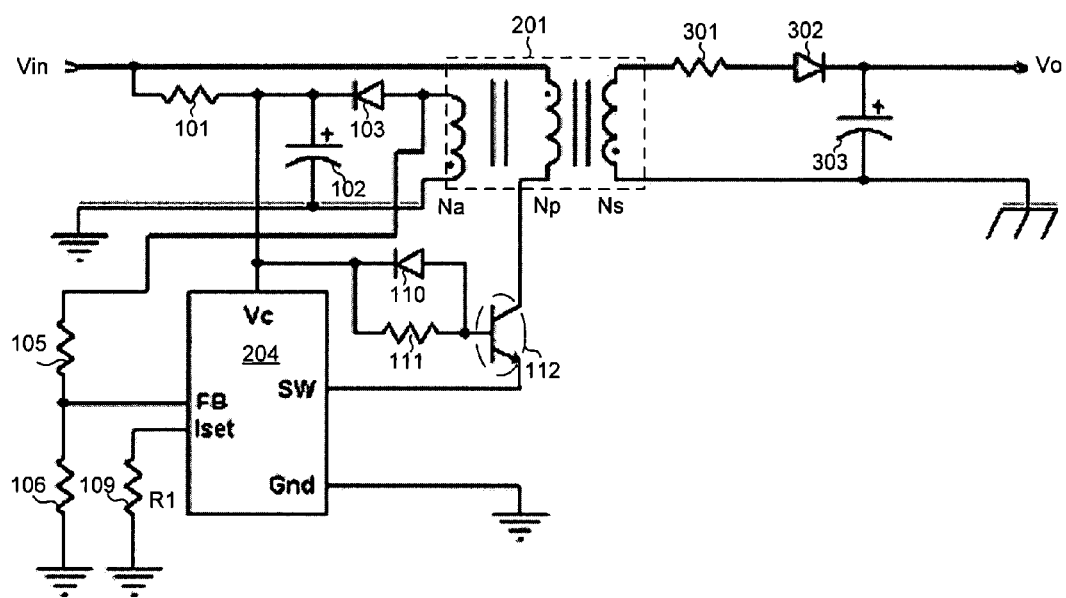
FIG. 6 illustrates an exemplary schematic of a primary side controlled constant output current Flyback converter in an Emitter Switching configuration using the first IC chip embodiment, in accordance with an embodiment of the present invention.

FIG. 6 illustrates an exemplary schematic of a primary side controlled constant output current Flyback converter in an emitter switching configuration using the first IC chip embodiment, in accordance with an embodiment of the present invention. For many low power applications, using current on-chip MOSFET technology, no external power MOSFET or current sense circuit is needed. For higher output power and/or higher switching frequency than the internal on-chip MOSFET can properly handle, however, external power handling components may be required. For example, the approach of the present embodiment is to introduce NPN bipolar transistor 105 that cooperates with IC chip 204, of the present invention, in an emitter switching configuration as shown in the figure. In such a configuration, internal MOSFET 415 drives the emitter of external NPN transistor 105 which serves as the main switch. To further increase the power handling capability and switching frequency, an external MOSFET is typically used as the main switch.

Figure 7:
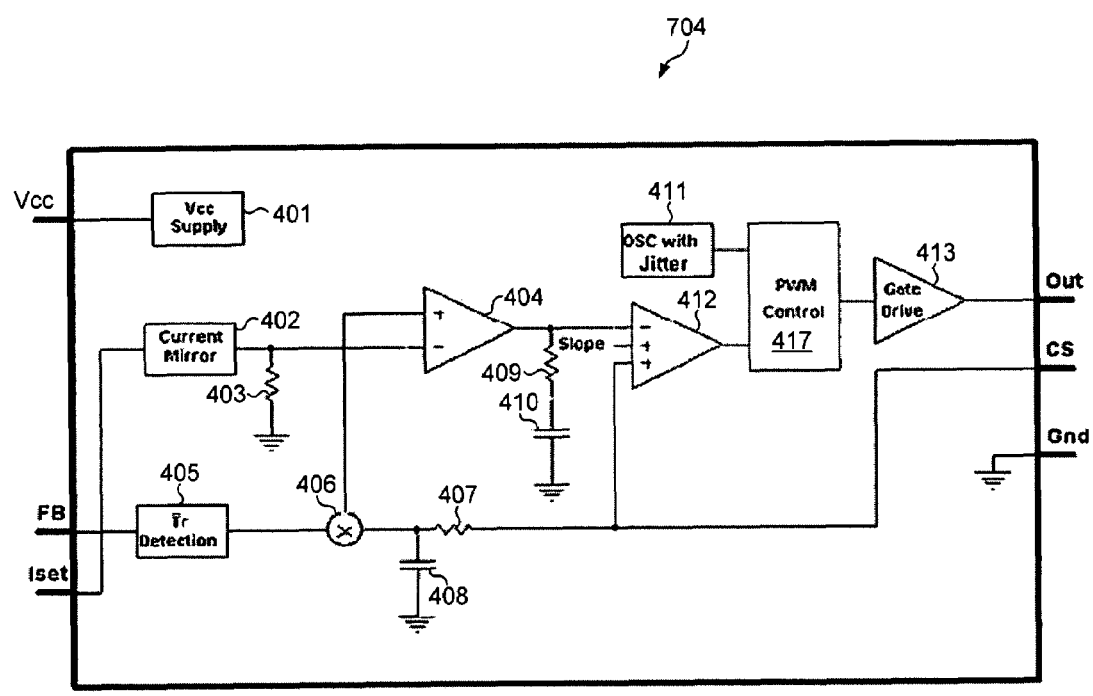
FIG. 7 illustrates an exemplary block diagram of a PWM controller IC chip 704, in accordance with a second embodiment of the present invention.
Figure 8:
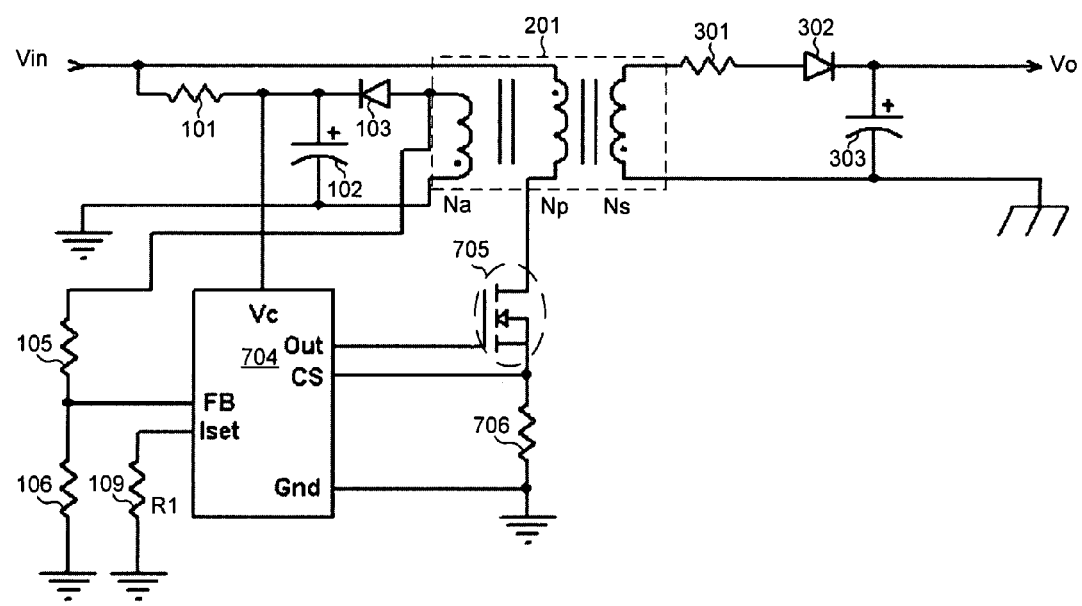
FIG. 8 is an exemplary schematic of a primary side controlled constant output current Flyback converter using the second embodiment with an external MOSFET and current sensing resistor.

FIG. 7 illustrates an exemplary block diagram of a PWM controller IC chip 704, in accordance with a second embodiment of the present invention. IC chip 704 does not include internal power MOSFET 415, current sensing MOSFET 414, and current sensing resistor 416 from the first IC chip embodiment of FIG. 3. In this second embodiment, the current driving capability of gate drive 413 results in improved control for larger MOSFETs. FIG. 8 illustrates an exemplary schematic for implementing IC chip 704 with an external MOSFET and a current sense resistor.

Figure 9:
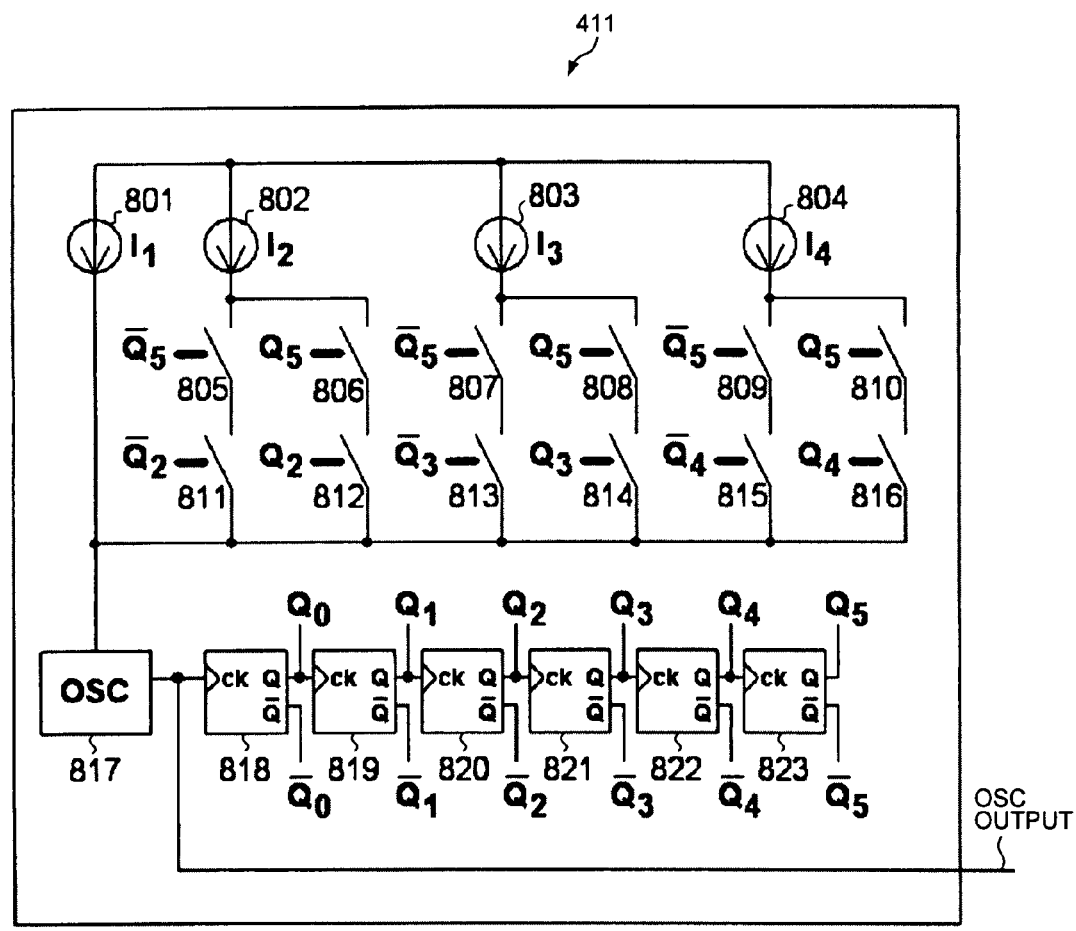
FIG. 9 illustrates a schematic diagram of an exemplary digital frequency jittering circuit that is suitable to implement the foregoing jitter functional block, in accordance with an embodiment of the present invention.

The functional blocks shown in the prior embodiments may be implemented in accordance with known techniques as will be readily apparent to those skilled in the art. However, some embodiments of the present invention include implementation approaches that are not conventional. For example, without limitation, the foregoing jitter functional block may be implemented as follows. FIG. 9 illustrates a schematic diagram of an exemplary system oscillator 411 having a digital frequency jittering circuit that is suitable to implement the foregoing jitter functional block, in accordance with an embodiment of the present invention. The frequency jittering in the present embodiment is implemented by a digital control scheme, which departs from known approaches. An oscillator 817 is preferably a current controlled oscillator. There is preferably an uncontrolled, base-line, current source 801, which, in one aspect, is present to set a minimum oscillator frequency, Fmin, that the switched current sources will jitter from. In the embodiment shown, the current to oscillator 817 is controlled by a multiplicity of switched current sources 802-804 that carry out the jittering of the oscillator's minimum frequency. The frequency of the system oscillator output signal is generally proportional to the total current entering into oscillator 817. In alternate embodiments, any number of current sources may be implemented depending upon the needs of the particular application. The jitter behavior is generated by feeding back the output signal of oscillator 817 to a multiplicity of series connected flip-flops (e.g., 818 to 823). Current sources 801, 802, 803 and 804 are presently preferred to be currents of magnitudes 100 µA, 2.5 µA, 5 µA and 10 µA, respectively. Each switched current source is presently configured with four current control switches (e.g., control switches 805, 806, 811 and 812 for switched current source 802) that are arranged in two parallel legs with each leg having two switches in series. In this way, for current to flow into oscillator 817 at least one leg must have both of its switches turned on. In similar fashion, four switches (807, 808, 813 and 814) are connected to switched current source 803 and another four switches (809, 810, 815 and 816) are connected to switched current source 804. All of these switches are closed or open by a control input from an output from the series connected flip-flop chain. In the example shown, the switch 805 is open when $Q_5$ is at logic level "1" and is closed when $Q_5$ is at logic level "0". Similarly, the 806 switch is open when $Q_5$ is at logic level "0" and is closed when $Q_5$ is at logic level "1", and so on. When all the switched current sources are enabled, a maximum frequency, Fmax, of the system oscillator output signal is achieved. As will be readily apparent to those skilled in the art, in light of the present teachings, the choice of which flip-flop outputs connect to which current control switch will determine a certain jittering pattern. An aspect of this digital frequency jittering scheme is that the period & the step of frequency variation may be relatively precisely controlled, and is largely insensitive to temperature variations. It should be appreciated that in contrast to conventional analog techniques for jittering the oscillator frequency, the digital jittering approach of the present embodiment always provide digitally calculated frequency step irrespective of the known shortcomings that analog based techniques suffer from; such as, without limitation, temperature, input, output age dependences, etc. Those skilled in the art, in light of the present teachings, will readily recognize a multiplicity of alternate and suitable implementations that implement the spirit of the present embodiment. By way of example, and not limitation, current based operation may be replaced with a voltage based approach, and the number and topology of the switches and/or current sources and/or flip-flop chain may be altered as needed for the particular application, and other suitable means to selectively control the pattern of current flowing into the current controlled oscillator.

Figure 10:
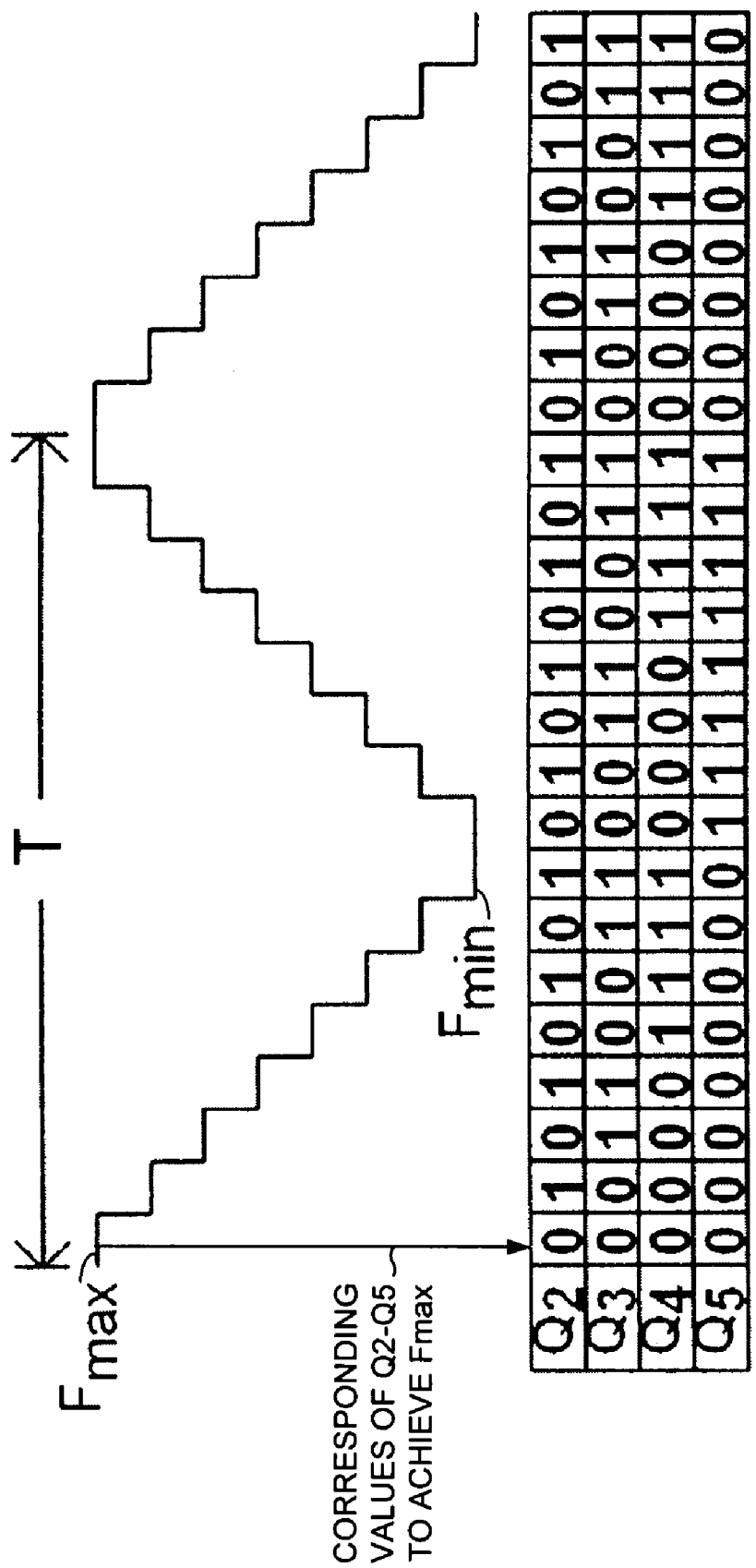
FIG. 10 illustrates an exemplary jitter frequency control logic diagram for the exemplary digital frequency jittering circuit of FIG. 9, in accordance with an embodiment of the present invention Unless otherwise indicated illustrations in the figures are not necessarily drawn to scale.

FIG. 10 illustrates an exemplary jitter frequency control logic diagram for the exemplary digital frequency jittering circuit of FIG. 9, in accordance with an embodiment of the present invention. In the example shown, frequency variation from its maximum (Fmax) to minimum (Fmin) corresponding to the logic states "0" or "1" of $Q_2$, $Q_3$, $Q_4$ and $Q_5$.

Having fully described at least one embodiment of the present invention, other equivalent or alternative methods of implementing a primary side constant output current controller according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A constant output current controller system for a switching regulator the system comprising:
   a transformer reset time detector with an input lead that is operable to receive a feedback signal derived from a transformer winding—and, wherein the transformer reset time detector computes a transformer reset time signal based in part on the feedback signal, and wherein the transformer reset time signal represents a duration of time until the feedback signal has decayed to approximately a steady rate;
   a calculator unit, that generates a combined signal by multiplying the transformer reset time signal by a current signal through a power switch;
   an error amplifier, which outputs a signal based on the difference between a reference signal and the combined signal, wherein the reference signal is sets by an output current level of the switching regulator;

a comparator that is configured to compare the combined signal and at least one ramp signal;
an oscillator, wherein the oscillator output includes jitter generated signal digitally as opposed to using an analog technique;
a PWM controller module that outputs a PWM switching regulator control signal based on an oscillator output from the oscillator and an output from the comparator; and
a gate drive module that receives the PWM switching regulator control signal and generates a corresponding gate drive signal operable for properly turning on or off the power switch of the switching regulator, wherein the gate drive signal turns the power switch on and off such that the output current level of the switching regulator remains constant.

2. The constant current controller system of claim 1, further comprising:
a programmable current mirror circuit, wherein the programmable current mirror circuit outputs the reference signal.

3. The constant current controller system of claim 1, wherein the power switch comprises a power MOSFET that is configured as a main power switch of the switching regulator.

4. The constant current controller system of claim 1, further comprising:
a current sensing circuit for generating at least one of the at least one ramp signal.

5. The constant current controller system of claim 4, wherein the current sensing circuit comprises a MOSFET connected in parallel with the power switch.

6. The constant current controller system of claim 1, wherein the comparator comprises a peak current mode PWM comparator with a slope-compensation input.

7. The constant current controller system of claim 1, wherein the feedback signal is not derived from a signal associated with a secondary output winding of a transformer.

8. The constant current controller system of claim 1, wherein the feedback signal is derived only from a signal associated with an auxiliary winding of a transformer.

9. The constant current controller system of claim 1, wherein the power switch is configured to form a Flyback converter, the power switch being a power MOSFET device or an NPN bipolar transistor in an emitter switching configuration.

10. A constant output current controller integrated circuit (IC) device, the IC device comprising:
a transformer reset time detector, with an input lead that is operable to receive a feedback signal derived from a transformer winding, wherein the transformer reset time detector computes a transformer reset time signal based on the feedback signal, and wherein the transformer reset time signal represents a duration of time until the feedback signal has decayed to approximately a steady rate;
a calculator circuit, that generates a combined signal by multiplying the transformer reset time signal by a current signal through a power switch;
an error amplifier, which outputs a signal based on the difference between a reference signal and the combined signal, wherein the reference signal is set by an output current level of the switching regulator;
a comparator that is configured to compare the combined signal and at least one ramp signal;
a gate drive module that receives a PWM switching regulator control signal that is based on an output of the comparator, wherein the gate drive module generates a corresponding gate drive signal operable for properly turning on or off the power switch of the switching regulator, wherein the gate drive signal turns the power switch on and off such that the output current level of the switching regulator remains constant; and
an oscillator that generates the oscillator signal to include jitter generated signal digitally as opposed to using an analog technique.

11. The constant current controller IC device of claim 10, further comprising:
a programmable current mirror circuit, wherein the programmable current mirror circuit outputs the reference signal.

12. The constant current controller IC device of claim 10, wherein the power switch is a power MOSFET that is configured as a main power switch of the switching regulator.

13. The constant current controller IC device of claim 10, further comprising:
a current sensing circuit for generating at least one of the at least one ramp signal.

14. The constant current controller IC device of claim 13, wherein the current sensing circuit comprises a MOSFET connected in parallel with the power switch.

15. The constant current controller IC device of claim 10, wherein the comparator comprises a peak current mode PWM comparator with a slope-compensation input.

16. The constant current controller IC device of claim 10, wherein the feedback signal is not derived from a signal associated with a secondary output winding of a transformer.

17. The constant current controller IC device of claim 10, wherein the feedback signal is derived only from a signal associated with an auxiliary winding of a transformer.

18. The constant current controller IC device of claim 10, wherein the power switch is external to the IC device and the gate drive module is configured to properly drive the external power switch, and wherein the external power switch is a power MOSFET device or an NPN bipolar transistor in an emitter switching configuration.

19. The constant current controller IC device of claim 10, further comprising:
a printed circuit board (PCB), wherein the integrated circuit (IC) device is communicatively coupled with the PCB, the PCB being optionally populated with the necessary electronic components such that, in functional combination with the integrated circuit (IC) device, the PCB is operable to perform as a constant current switching regulator.

20. A constant output current controller system for a switching regulator, the system comprising:
a terminal for receiving a signal that sets a desired output current level of the switching regulator;
means for computing a transformer reset time signal, wherein the transformer reset time signal represents a duration of time until a feedback signal decays to approximately a steady rate;
means for generating a calculated combined signal by multiplying the transformer reset time signal by an average current;
means for generating an error signal based on the difference between the signal that sets the desired output current level and the combined signal;
means for comparing the error signal and at least one ramp signal;
means for generating an oscillator signal;

means for generating a PWM switching regulator control signal based on the oscillator signal and an output of the means for comparing; and means for generating a gate drive signal operable for properly turning on or off a switched power output device of the switching regulator, the gate drive signal corresponding to the PWM switching regulator control signal, wherein the switching regulator outputs a constant output current.

21. The constant current controller system of claim 1, wherein the combined signal is a product of the transformer reset time signal and an average current through the primary winding.

22. The constant current controller IC device of claim 10, wherein the combined signal is a product of the transformer reset time signal and an average current through the primary winding.

23. A method comprising:
determining a transformer reset time signal based on a feedback signal received from a transformer, wherein the transformer reset time signal is based in part on a rate of change of the feedback signal;
multiplying the transformer reset time signal by an average current through a power switch to form a calculated current value;
providing an error signal based on a difference between the calculated current value and a reference signal, wherein the reference signal is set by an output current level of a switching regulator;
providing a comparison signal between the error signal and at least one ramp signal;
outputting a switching regulator signal based on an oscillator signal and the comparison signal, wherein the oscillator signal includes jitter generated digitally as opposed to using an analog technique; and
generating a gate drive signal to turn-off or turn-on at the power switch, wherein the signal power switch is turned-off and turned-on such that the output current level of the switching regulator remains constant.

24. The method of claim 23, wherein the transformer reset time signal represents a duration of time over which the feedback signal decays to approximately a steady rate.

25. The method of claim 23, wherein the transformer reset time signal is based on a voltage waveform at an auxiliary side of the transformer.

26. The method of claim 23, further comprising:
providing a current of the power switch using a current sense circuit.

* * * * *

UNITED STATES PATENT AND TRADEMARK OFFICE
CERTIFICATE OF CORRECTION

PATENT NO.       : 7,388,764 B2
APPLICATION NO.  : 11/311656
DATED            : June 17, 2008
INVENTOR(S)      : Huynh et al.

It is certified that error appears in the above-identified patent and that said Letters Patent is hereby corrected as shown below:

Column 8, line 52, a comma should be inserted after the word "regulator".
Column 8, line 55, the characters "--and" should be deleted.
Column 8, line 61, a comma should be inserted after the word "unit".
Column 8, line 66, "sets" should be changed to --set--.
Column 9, line 4, the word "signal" should be deleted.

The text from column 8, line 51 through column 9, line 5, claim 1 should now read:

--1. A constant output current controller system for a switching regulator, the system comprising:
   a transformer reset time detector with an input lead that is operable to receive a feedback signal derived from a transformer winding, wherein the transformer reset time detector computes a transformer reset time signal based in part on the feedback signal, and wherein the transformer reset time signal represents a duration of time until the feedback signal has decayed to approximately a steady rate;
   a calculator unit that generates a combined signal by multiplying the transformer reset time signal by a current signal through a power switch;
   an error amplifier, which outputs a signal based on the difference between a reference signal and the combined signal, wherein the reference signal is set by an output current level of the switching regulator;
   a comparator that is configured to compare the combined signal and at least one ramp signal;
   an oscillator, wherein the oscillator output includes jitter generated digitally as opposed to using an analog technique;--

Column 9, line 49, the comma after the word "detector" should be deleted.
Column 9, line 57, the commas after the word "circuit" should be deleted.
Column 10, line 8, the word "signal" should be deleted.

UNITED STATES PATENT AND TRADEMARK OFFICE
CERTIFICATE OF CORRECTION

PATENT NO. : 7,388,764 B2
APPLICATION NO. : 11/311656
DATED : June 17, 2008
INVENTOR(S) : Huynh et al.

Page 2 of 2

It is certified that error appears in the above-identified patent and that said Letters Patent is hereby corrected as shown below:

Lines 49-59 of column 9 claim 10 should now read:

--a transformer reset time detector with an input lead that is operable to receive a feedback signal derived from a transformer winding, wherein the transformer reset time detector computes a transformer reset time signal based on the feedback signal, and wherein the transformer reset time signal represents a duration of time until the feedback signal has decayed to approximately a steady rate;
a calculator circuit that generates a combined signal by multiplying the transformer reset time signal by a current signal through a power switch;--

Lines 7-9 of column 10 claim 10 should now read:

--an oscillator that generates the oscillator signal to include jitter generated digitally as opposed to using an analog technique.--

Signed and Sealed this

Ninth Day of September, 2008

JON W. DUDAS
*Director of the United States Patent and Trademark Office*